No. 751,803. PATENTED FEB. 9, 1904.
G. MUSSO.
WIRELESS ELECTRIC APPARATUS ACTING ON TYPE WRITERS.
APPLICATION FILED SEPT. 23, 1902.
NO MODEL. 4 SHEETS—SHEET 1.
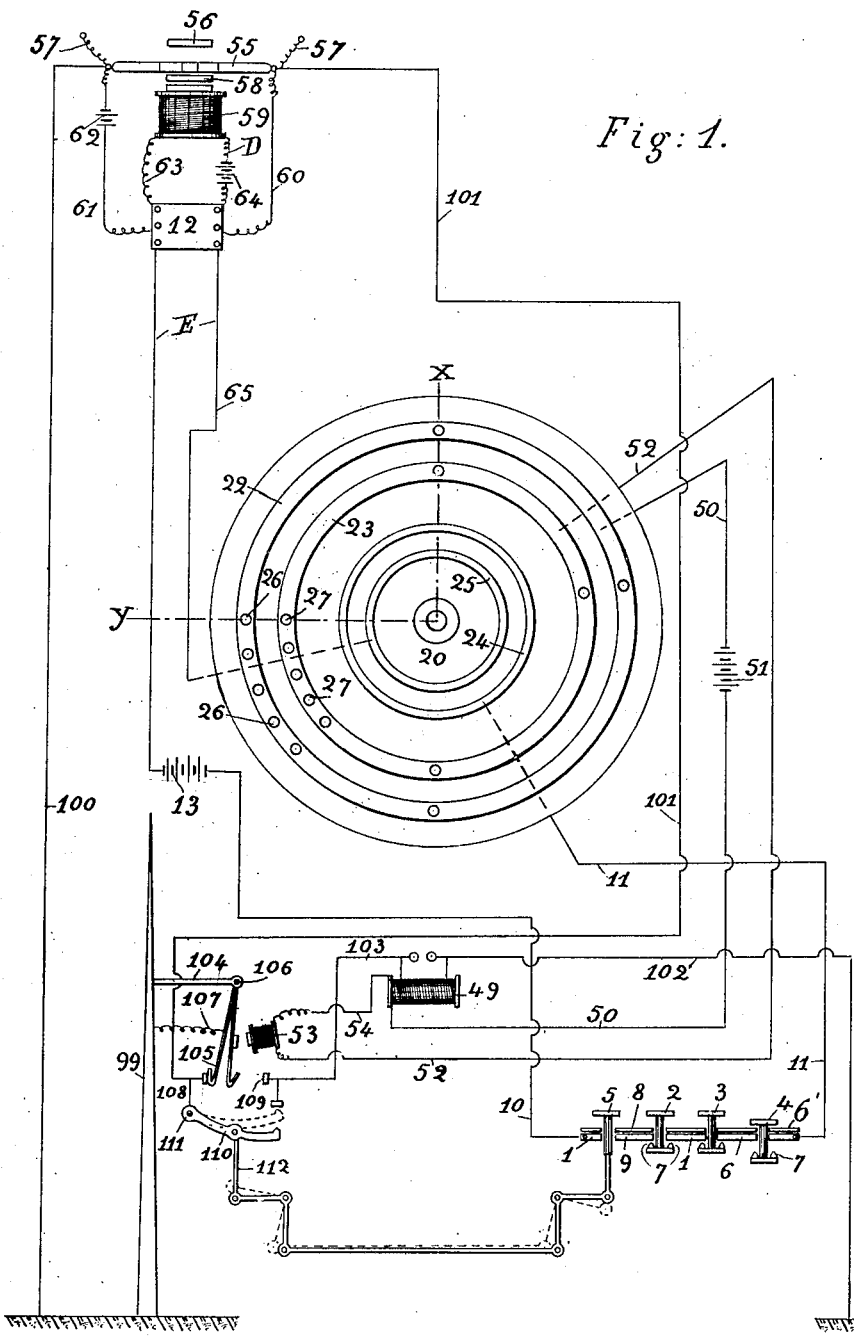
Fig: 1.

No. 751,803. PATENTED FEB. 9, 1904.
G. MUSSO.
WIRELESS ELECTRIC APPARATUS ACTING ON TYPE WRITERS.
APPLICATION FILED SEPT. 23, 1902.
NO MODEL. 4 SHEETS—SHEET 2.
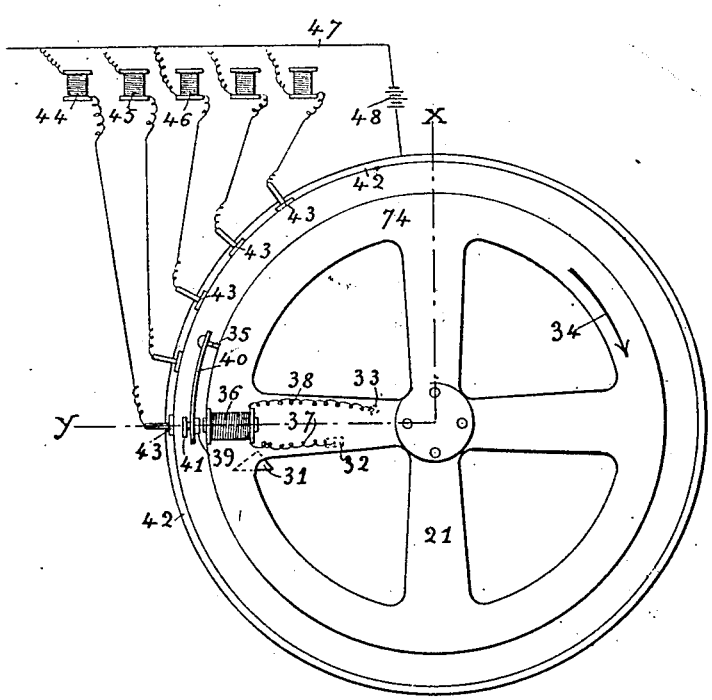
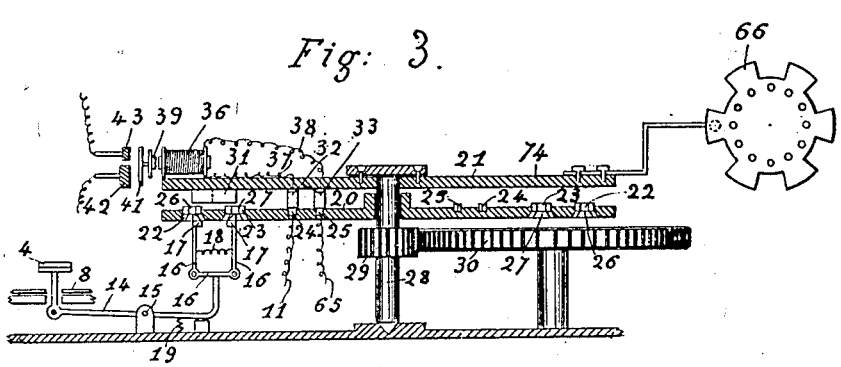
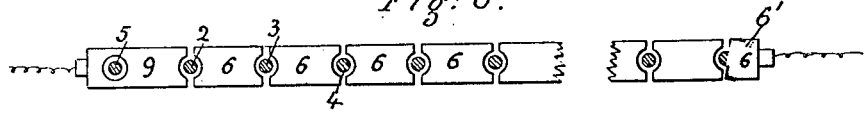
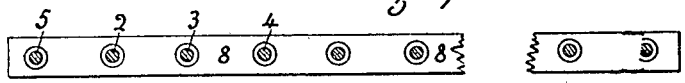

No. 751,803. PATENTED FEB. 9, 1904.
G. MUSSO.
WIRELESS ELECTRIC APPARATUS ACTING ON TYPE WRITERS.
APPLICATION FILED SEPT. 23, 1902.
NO MODEL. 4 SHEETS—SHEET 3.

No. 751,803. PATENTED FEB. 9, 1904.
G. MUSSO.
WIRELESS ELECTRIC APPARATUS ACTING ON TYPE WRITERS.
APPLICATION FILED SEPT. 23, 1902.
NO MODEL. 4 SHEETS—SHEET 4.
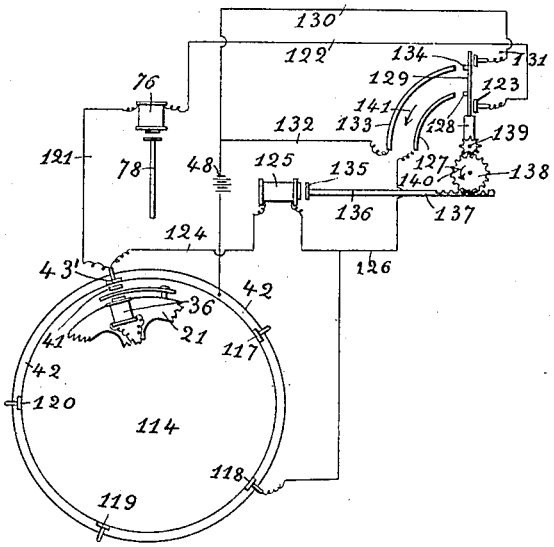
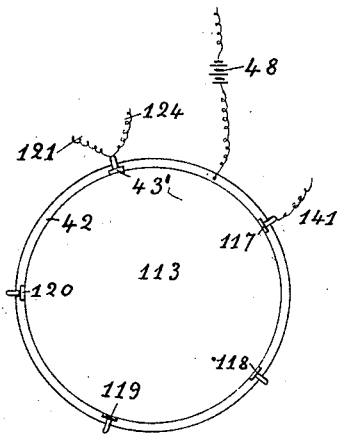
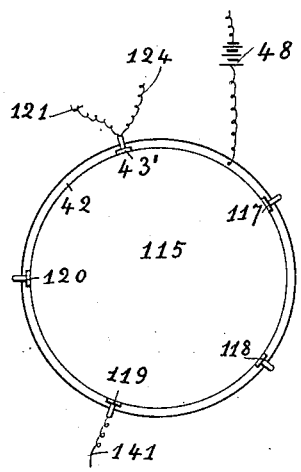
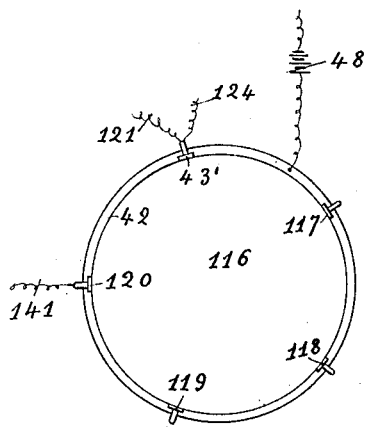

No. 751,803. Patented February 9, 1904.

UNITED STATES PATENT OFFICE.

GIUSEPPE MUSSO, OF S. ANGELO DEI LOMBARDI, ITALY.

WIRELESS ELECTRIC APPARATUS ACTING ON TYPE-WRITERS.

SPECIFICATION forming part of Letters Patent No. 751,803, dated February 9, 1904.

Application filed September 23, 1902. Serial No. 124,511. (No model.)

*To all whom it may concern:*

Be it known that I, GIUSEPPE MUSSO, a subject of the King of Italy, residing at S. Angelo dei Lombardi, Province of Avellino, Italy, have invented a new and useful Printing-Telegraph Electric Apparatus Actuating Type-Writers or Printing Mechanism; and I do hereby declare the following to be a full, clear, and exact description of the same.

The present invention relates primarily to a wireless electric apparatus by means of which suitable type-writers or printing mechanism adapted for such purposes may be operated at a distance.

It consists, broadly and usually, in the utilization for such purpose of the electric waves generated by an oscillator and collected by an aerial conductor and conveyed to a coherer, the command of two disks rotating synchronously in the communicating stations, which disks are connected with the keys of the type-writer. The apparatus is also provided with a special device by means of which the transmitting-station is enabled to cut off any station to which it is not desired to transmit the communications, whereby secrecy is secured, although in some cases the wireless action may be omitted and an ordinary electric circuit of connection from station to station be used.

Said invention is fully shown and described in the following specification, of which the accompanying drawings form a part, wherein similar letters or numerals of reference designate like or equivalent parts wherever found through the several views, and in which—

Figure 4:
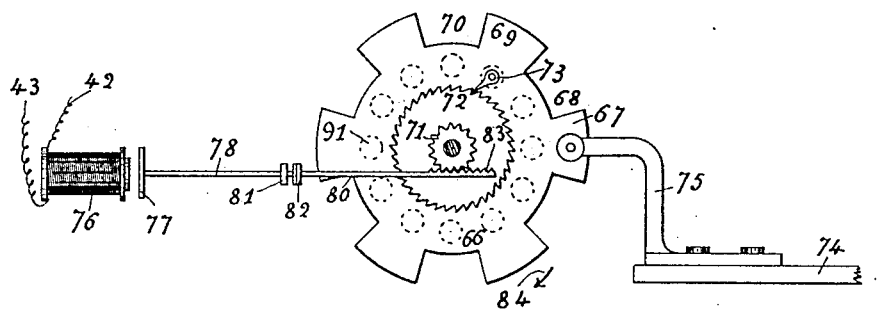
Figure 5:
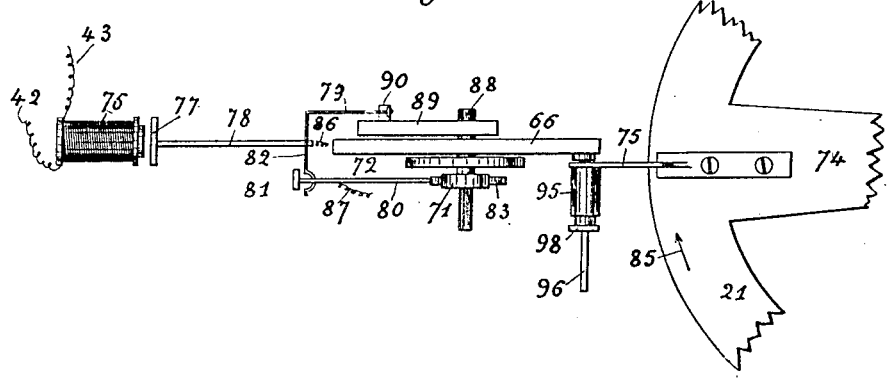
Figure 8:
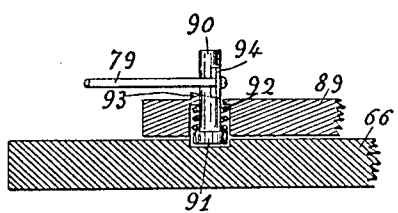
Figure 9:
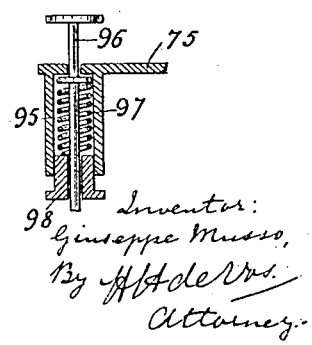

Figure 1 is a diagrammatic view of the apparatus at any single station, the fly-wheel being removed and a less number of keys than are used in practice for the sake of clearness only being shown and the cutting out or selecting device by which any desired set of stations may be cut out from operation, as well as the printing mechanism, being omitted. Fig. 2 is a top plan view of a portion of the apparatus, showing the fly-wheel in position and adapted to be brought into proper electric actuating connection with the individual magnets operating the type-bars or printing-levers of the printing mechanism (not shown) when receiving messages. Fig. 3 is a side view, in central vertical section, of a portion of the mechanism shown in Fig. 2. Fig. 4 is a side view in detail of the starting and stopping mechanism. Fig. 5 is a top plan view of the mechanism shown in Fig. 4. Fig. 6 is a view in detail of one line of the electric keyboard-plates, taken from the top; and Fig. 7 is a view of the continuous electric top plate adapted to connect the plates shown in Fig. 6 together. Fig. 8 is a view in detail of the catching device of the rotating trip-wheel shown in Figs. 4 and 5, taken in cross-section; and Fig. 9 is a like view of the buffer of the catching mechanism, by which jar to the mechanism is prevented upon its stoppage. Fig. 10 is a detail view of the cutting-out and selecting ring of a station with its connections; and Fig. 11 is a diagrammatic view of the selection and cutting-out mechanism of a station, by which any desired number of stations may be excluded from the circuit set up by the operation of the device; and Figs. 12 and 13 as well as 10 show the selecting-ring and connections of three stations connected with the station shown in Fig. 11, so as to show the slight difference between the same which brings about the cutting-out and selection of stations.

It will be evident upon a careful examination of the description and drawings that the main portion of the mechanism may be used and successfully operated over a closed circuit of the usual form with as great success as it may be used for wireless telegraphy, and I do not intend to limit myself either to the exact construction shown or use as a wireless apparatus nor to any particular form of printing device, as any device capable of making proper impressions in any way may be used and connected operatively with the transmitting and receiving devices—such, for instance, as an ordinary type-writer of any form for use as a recording mechanism for the recording of the messages at both sending and receiving stations—and in some instances the apparatus invented by me may be used for controlling the actuation of a plurality of selectible levers or moving parts at one or more distant stations which perform other functions than those of impressing characters or marks upon a suitable receiving-surface, and I do not, therefore, limit myself to the exact construction shown nor to the particular use described.

Referring to the drawings, the transmitting and receiving mechanisms—that is, the electrical portion, or that portion outside of the printing or recording portions—are so bound up together, so interwoven, and so many various parts thereof act sometimes as part of the receiver and at the other times as part of the transmitting mechanism that they are practically one mechanism and inseparably connected.

In Fig. 1 is shown in diagrammatic view one of such combined transmitting and receiving mechanisms of my improved form. In this the device is provided with a keyboard, usually of the ordinary type-writer form, so that any person having skill in the use of the ordinary type-writer can manipulate the same, which keyboard is provided with a number of keys 2 3 4, &c., usually forming an alphabet, though in the drawings, Fig. 1, for the sake of simplicity only three keys are shown. The device is further provided with a calling or starting key 5, which differs in operation from the others in that it does not break the circuit of the local main battery when it is pushed down, as will be hereinafter further explained. The keyboard consists of a number of thin metal plates 6, an end plate 9, and an end plate 6', Fig. 6, insulated from each other, between which are located the insulated stems of the keys 2 3 4, &c. The keys are of non-conducting material throughout, with the exception of the bases, where they are provided on either side with a contact 7, Fig. 1, whereby when they are all in the normal and raised position of rest the electrical continuity between all the conducting-plates 6 is secured and when one of them is lowered the circuit is broken. The calling-key 5 is not provided with the contact 7, but it slides within a small plate 9. Therefore its movement does not alter the continuity of the circuit, as before stated. The end plate 9 of the keyboard is in communication with the relay 12, by means of the conducting-wire 10, Fig. 1, in which is included a battery 13, and the other end plate, 6', is in communication with a ring 24, of copper or other suitable metal, by means of the conducting-wire 11. Above the keyboard-plates 6, 6', and 9 is arranged a continuous metallic plate 8, Fig. 7, provided with holes for the passage of the key-stems, which is normally out of contact with the keyboard-plates 6, 6', and 9, but which will when it is lowered and put in contact with the said plates so connect them all together that the electric continuity of the keyboard will be no longer broken by lowering or pushing down any one of the keys.

Each key—for instance, the key 4 (see Fig. 3)—acts on a lever 14, pivoted at 15 and provided at an outer end with two linked uprights 16, of conducting material, but insulated from one another, each provided with a tooth or catch-head 17 at its end. A spiral spring 18 tends to constantly approach the uprights 16, while another spiral spring, 19, tends to raise the key 4 as soon as the pressure of the hand on its head ceases. Adjacent to the keyboard is a disk 20, which carries on its upper face the ring 24, and above this is mounted the fly-wheel 21, Figs. 2 and 3. The disk 20 consists of a plate of insulating material, such as ebonite, in which are inserted four copper rings 22, 23, and 25, in addition to the ring 24, before mentioned. The ring 22 is provided with holes 26 and the ring 23 with similar holes 27, arranged, as shown, on the same radii of the disk adjacent to each key, so as to receive the toothed heads 17 of the uprights 16. When the key is pushed down, the hooks are clutched above the disk 20 by the action of the spiral spring 18 when passed through the rings. Above the disk 20 and coincidently axial to it is placed the fly-wheel 21, rotating on the axle 28 and provided with a pinion 29, gearing with a wheel 30, actuated by a suitable clock or other motor.

On the lower face of the fly-wheel is secured a wedge-shaped metallic contact-piece 31, usually of brass, just over the rings 22 and 23, but out of contact therewith, and two metallic brushes 32 and 33 in contact, respectively, with the rings 24 and 25.

When the fly-wheel rotates to the right, as indicated by the arrow 34, after a key has been pushed down, the contact-piece 31 will on the movement of the wheel encounter the heads 17 of said key, thereby closing the circuit between the rings 22 and 23. This contact-piece, however, in consequence of its wedge-shaped form, being narrower at the end toward which it moves, penetrates at the same time between the two hooks 17, releasing them from the disk 20, and then, under the action of the spring 19, the key 4 rises to its position of rest. The fly-wheel 21 carries a polarized electromagnet 36, rotating with it and communicating, by means of the conductors 37 and 38, with the brushes 32 and 33, respectively. Its armature 39, of soft iron, is carried by a spring 40, fixed to the insulating-post 35, and is fitted with the contact-plate 41. Concentric with the fly-wheel is located an annular conducting-ring 42 and a number of conducting-plates 43, corresponding in number to the keys. These small plates 43 are connected with an equal number of electromagnets 44 45 46, &c., all of them communicating with the ring 42 by means of the conducting-wire 47, the circuit including also a battery 48. The armatures of the electromagnets 44 and 45, &c., are in actuating connection with the type-levers of the type-writer keys. The electromagnet 36 being polarized, the armature 39 will remain attracted; but if a current is caused to flow through the coil 36 the armature will be released and the plate 41 will establish an electrical communication between the ring 42 and that one of the plates 43 at that instant immediately opposite the magnet, exciting the particular electromagnets 44 45, &c., connected with such plate, and this through the actuation of the armature of such magnet through the intervening mechanism connected with the proper type-letter lever or bar of the typewriter (not shown) will cause the proper letter to be impressed on the paper in the typewriter in the well-known manner.

The oscillator 49, Fig. 1, which may be of any suitable form, has one pole of its primary circuit connected to the ring 22 by the conducting-wire circuit composed of the wire 50, in which is inserted the battery 51, and by way of the other pole to the ring 23 by means of the conductor in series 52 and 54, between which is interposed the electromagnet 53, the purpose and operation of which will be explained farther on more fully. The coherer 55, which may be of any suitable form, is by the action of the spring 57, to which it is connected, constantly pressed toward the support 56, and to this coherer is attached an armature 58, of soft iron, adapted to be actuated by the polarized electromagnet 59. The double relay 12 is connected with the coherer by means of the conductors 60 and 61, in which circuit is inserted the battery 62. The said relay serves at the same time to put in action the circuit formed in the wires 64 and 63, which includes the electromagnet 59, and in which circuit is also included the battery 64, the wire 65 being connected with the ring 25 and the wire 64 being connected by way of the battery 13 with the conductor 10, leading to the keyboard 9. The working of the apparatus will now be explained. It is supposed that the fly-wheels 21 of the transmitting and receiving stations rotate synchronously, so that they having been started at the same time from the same points will at any moment find themselves in the same positions. If at the transmitting-station a key is lowered—for instance, the key 4—the circuit through the keyboard will be interrupted. At the same time the hooks 17 will, Fig. 3, enter the holes 26 and 27, placing themselves above the rings 22 and 23. On the passage of the metallic wedge 31 the circuit of the oscillator 49 will be closed, and the electric waves will excite the coherers of both stations.

The coherer of the transmitting-station does not work because of the interruption of the circuit of the keyboard, as before said; but if it is desired to record the signals in this station too it would be sufficient to lower the plate 8, so as to bring the same into contact with the small plates 6 and 9, so as to keep the circuit closed, notwithstanding the lowering of the keys. In the receiving-station, there being at this movement no lowered keys, there will therefore be no interruption of the circuit. Consequently the excited coherer will actuate the relay 12, which in turn will operate the circuits D and E—D D for the decohesion of the coherer and the E for the impression of an alphabetical sign. In fact, as shown in Fig. 1, the current passes from the battery 13 through the conductor 10, the keyboard, and the conductor 11 to the ring 24; from this, by means of the brush 32, Fig. 3, through the conductor 37, the polarized electromagnet 36, the conductor 38, the brush 33 to the ring 25, thence through the conductor 65 and the relay 12 returns to the battery 13. The polarized electromagnet 36, excited by the current, releases the armature 39, and the plate 41 connects the ring 42 with the plate 43, &c., corresponding to that particular one of the electromagnets of the levers of the type-writer—for instance, the electromagnet 44. The current flowing through the electromagnet 44 operates the armature of the same, which impresses a letter on the paper of the type-writer. (Not shown.) These operations are performed synchronously and instantaneously at both stations. At the transmitting-station, however, it is necessary to keep the plate 8 lowered to and pressed upon the keyboard in order to avoid interruption in the circuits comprising the electromagnets of the type-writer. These operations performed at the same instant the wedge-shaped contact-piece 31, Figs. 2 and 3, will have acted on the uprights 16 of the key, so as to unlock and lower them, and at the same time the coherer, attracted by the electromagnet 59, Fig. 1, becomes non-conducting, the circuit through the same being interrupted. The electromagnet 59 becomes inactive, and the coherer will again abut against magnet 59. The whole apparatus returns then to its initial position ready to work again in a similar manner when another key is lowered and while the fly-wheels 21 continue to synchronously rotate. It has been assumed till now that the wheel was already in motion. It will now be described in what manner the calling is performed and the starting of the device effected. The wedge-shaped contact-piece 31, as shown in Fig. 3, is by the rotation of the fly-wheel brought to rest over the pair of holes 26 and 27 corresponding to the call-key 5, so that by lowering the said key the oscillator 49 is actuated and the coherers of both stations excited, with results analogous to those already explained, although not to impress a letter, but to remove a clicket of a clockwork, (not shown,) thus producing the simultaneous starting of both fly-wheels and when it is desired also the ringing of a bell and the actuation of a visible signal. At the end of the communications the same call-key is again lowered, which will return the fly-wheel clicket to its normal position of rest. This calling mechanism is formed as follows, as shown in Figs. 3, 4, 5: 66 is a disk suitably supported adjacent to the periphery of the fly-wheel, which is provided with teeth 67 69, &c., alternating with notches 68 70, &c., the teeth being of the same width as the notches. This disk is mounted loose on a spindle, on which is also placed the small toothed wheel 71, which is also loose and rigidly secured to the ratchet-wheel 72, on which operates the pawl 73, pivoted to the disk 66. On the fly-wheel near to its periphery is placed the small double-cranked rod 75, the end of which, when the fly-wheel is at rest, abuts against the tooth 67 of the disk 66. The lowering of the calling-key, as already explained, by the excitement of the coherer closes a circuit similar to the one for the impression of the letters—namely, by means of contact-plate 41 the circuit between the ring 42 and one of the plates 43 is closed, the latter plate, 43, being in electrical connection with the electromagnet 76, acting on the armature 77, placed at the extremity of the rod 78, connected with a rod 79, operating also the rod 80, when the head 81 of this latter is met by the cross-piece 82 during the movement of the armature 77 toward the electromagnet 76. The rod 80 ends in a rack 83, gearing with the small toothed wheel 71, causing it to rotate together with the wheel 72, with which it is connected. The wheel 66, by the action of the pawl 73, is obliged also to rotate in the direction of the arrow 84 in Fig. 4, when the notch 68 will be moved into the place of the tooth 67. The wheel is thus freed from the rod 75 and is free to rotate continuously in the direction of the arrow 85 as long as the toothed wheel or disk remains in the said position. As soon as the action of the electromagnet 76 ceases through the release of the call-key the rods 78 and 80 are returned to their normal position by means of the spiral springs 86 and 87, the rack 83 causing the wheels 71 and 72 to rotate in the opposite direction; but the wheel 66 does not follow their movement, and the notch 68 will continue to remain in registry with the rod 75, so as to pass freely from the end thereof once in each revolution; but if the calling-key is for the second time lowered, which happens at the end of a communication, the same operation will be again performed and the tooth 69 will take the place occupied by the tooth 67 in Fig. 4, thereby stopping the movement of the fly-wheel 21. Great care should be taken that the disk shall rotate exactly the exact distance required, and the effect is obtained by means of the mechanism fitted on the back face of the disk 66, as shown in Figs. 5 and 8. On the fixed shaft 88, which is common to the wheels 71 72 and to the disk 66, is placed the rod 89, provided with a hole containing the locking-pin 90, which, after having crossed the rod 89, penetrates for some millimeters into one of the recesses 91, arranged circularly in the back face on the disk 66, the number of which recesses is equal to that of the teeth and of the notches of said disk, so that as each tooth and each notch corresponds to one of these recesses the said locking-pin 90 is kept firmly in the recess 91 by means of the spiral spring 92. The outer face of the rod 89 presents an inclined plane 93, against the edge of which abuts a tappet 94, connected with the rod 79. To loosen this locking-pin 90, the rod 79 is first operated by pressing on the tappet 94, which causes the latter to rotate on itself, sliding at the same time on the inclined plane 93 and disengaging the disk 66. Meanwhile the cross-piece 82 has reached the head 81 of the rod 80 and the rotation of the disk 66 may be effected. The locking-pin 90 after the operation has been performed penetrates into the next groove 91. In order to prevent a violent shock to the mechanism when the arm 75 is brought suddenly against the teeth of the disk 66, the end of this rod is fitted with a tube 95, into which a rod 96 runs for compressing the spring 97, the action of which spring may be regulated by the cap 98, screwed into the tube 95, and by this mechanism the shock against the disk 66 will be borne by the head of the rod 96, as shown in Fig. 5. By lowering the special key 5, which acts as starting and stopping key at the beginning or at the end of the correspondence when the device is in operation, as before stated, the toothed disk 66 is caused to rotate for such portion of a rotation as to bring one of its teeth into contact with the small rod 75, thereby stopping the fly-wheel 21 at the place required for the position of rest. It has also been said that the movement of this disk 66 is produced by the closure of a circuit in consequence of the teeth 17 of said starting and stopping key coming in contact with the wedge-shaped contact-piece 31, which first closes the circuit and then separates the teeth, so as to allow the key to return to its position of rest. Now if the stopping of the fly-wheel happened instantaneously as soon as the above said circuit is closed the wedge would not have time enough to perform the second operation—namely, that of separating the teeth of the key—and the apparatus would thereby continue to work uselessly.

It is understood that owing to the velocity of the fly-wheel and the small space occupied by the wedge 31 this inconvenience is not likely to occur frequently. However, for greater security it is convenient to regulate the velocity of the fly-wheel 21 as well as the space between the teeth and of the notches of the disk 66 and the distance of the cross-piece 82 from the head 81 of the rod 80, so that the fly-wheel is obliged to complete another turn after the disk 66 has placed itself in the position of rest, so that the arrest of the fly-wheel 21 will take place when the key 5 is already in the position of rest. This result is brought about by the action of a radiator rod or wire 99, Fig. 1, which is brought into alternate communication with the oscillator and the coherer. To effect this, an electrode of the coherer and a ball of the oscillator are put in communication with the earth by means of the conductors 100 and 102, while the other electrode of the coherer and the other ball are put in communication with the rod 99 by means of the conductors 101 and 103. To the rod is attached the arm 104, from which branches off the switch 105, pivoted in 106 and regulated by the spring 107. In the primary circuit of the coil 49 is inserted the electromagnet 53. This will attract the switch 105 at each closure of the circuit by the action of the contact-piece 31, hereby establishing a contact between 105 and 109, and thus connecting the oscillator with the rod 99, which will act as a radiator. Soon after the spring 107 will reestablish the contact between 105 and 108 and the rod will be ready to act as a collector communicating the oscillations to the coherer—namely, rendering it sensitive. During this time of rest of the transmitter—that is, between two successive emissions—the local receiver is ready to receive the impulsions communicated from the other station and the simultaneous correspondence will continue regularly till it happens that both stations lower at the same time the key corresponding to the same letter. This will be easily understood because every letter occupies corresponding angular position in each station, and both receivers, owing to the simultaneous emission at both stations, remain inactive by the breaking at the same instant at each station of the contacts between 105 and 108, in consequence of which that particular letter will not be impressed. This inconvenience, which very seldom occurs, is not of a great importance, as it is easy to find out a single missing letter of a word or even number and can be easily avoided by displacing the relative angular position of the contact edge 31 in one station and of the magnet 36 in the other station.

To obtain the perfect operation of the device, it is neccessary to comply with the following conditions:

1. To prevent the interruption of the circuit of the keyboard when the keys are lowered—that is to say, to electrically connect with each other the small plates 6 and 9, Figs. 1 and 6, which is done by keeping the plate 8 pressed down on such plates, Figs. 1 and 7.

2. To protect the coherer from the radiations of the local oscillator, because although on the starting of the spark the said coherer does not communicate with the radiating-rod 99 still it would become directly sensitized.

3. To produce mechanically the starting and the arrest of the local fly-wheel by means of the key-lever itself, because the coherer becomes not excited in consequence only of the oscillations communicated to it by the rod 99 when this acts as a collector.

As to condition 2 this may be easily fulfilled, for it is only necessary to inclose the coherer 55 with the circuits 61 and 63 together with the relay 12 in one hermetically-sealed metal casing, introducing the conductors 100 and 101, which are covered with insulating material, into a flexible metal tube and establishing the electric communication of the casings and the tubes with the earth. The contacts 108 and 109 must not be placed too close one to the other, in order to avoid the passage of the electric waves from 108 to 109 with discharges through the air. The condition 3 may also easily be fulfilled, because by means of a system of levers (not shown) the lowering of the calling-key may be made to mechanically operate the plate 77 by forcing it to the electromagnet 76, as if this latter had been attracted by electromagnet action. In such a case the lowering of the calling-key would produce the simultaneous disengagement of the fly-wheels at both stations, owing to the movement of the rod 78 in the transmitting-station by mechanical action and in the receiving-station by the electric action. However, the perfect synchronism in the starting of both fly-wheels (which is of the utmost importance in the accurate and proper working of the device) can only be secured by the utilization of the electric radiations in both stations, excluding any mechanical action which could produce a delay in the starting. In order to permit of the local coherer becoming conductive under the action of the local radiations only in case where it has to start or stop the fly-wheel, to the contact 108 is attached an interrupter pivoted at 111. This breaker is attached to the end of lever 112 by a dielectric substance belonging to a system of levers controlled by the calling-key 5. When this is lowered, the interruption 112 closes the circuit between 108 and 109. The oscillations of this discharge are by this means communicated to the local coherer, which by the aid of the circuits of the batteries 13 and 48 will actuate the electromagnet 76, Figs. 1, 2, 4, and 5, while the electric radiations communicated to the rod 99 by means of the contact 105 and 109 will act at the same instant on the corresponding mechanisms of the receiving-station.

When there are more than two stations and any one desires to communicate with only one at a time without knowledge by or the interference of any of the others, this is accomplished by the mechanism shown in Figs. 11 to 13, inclusive, added to that already described.

In the present case it is assumed for purpose of demonstration that the corresponding stations are four in number; but they may of course be of any number, as will be seen from the description of the working of the mechanism. Only in Fig. 11 is such mechanism shown complete. In the other figures the mechanism is only partly illustrated. In Figs. 10 to 13 the contact 43' represents the one which corresponds to the main calling-key of each station. Besides this contact and all the others relating to the printing-signs, which need not be mentioned here, there are also other special contacts 117, 118, 119, and 120—that is, as many as there are stations—these contacts being arranged in the very same places with regard to the fly-wheel 21, so that, as all the fly-wheels of the four stations rotate synchronously, when the contact-plate 41 of a station passes at a certain moment in front of the contact 117 of the station 113 the same happens at the same time at the other stations, and the like will occur with regard to the contacts 118 119 120 of such other stations. It is evident also that the angular distances of such contacts may vary, and it is by no means necessary that they are the same. As the four stations are similarly arranged, it will suffice to examine the disposition of the circuits and the working of the mechanisms provided at the station 114, Fig. 11. From the contact 43 the conductor 121 leads to the electromagnet 76, thence through the conductor 122 to the contact 123. The other conductor, 124, traverses the electromagnet 125, and the conductor 126 connects with the plate 127, one extremity of which is arranged in front of a metal brush 128, mounted on the rod 129, such rod vibrating between the plate 127 and the contact 123. Similarly the conductor which comes from the ring 42 and has inserted the battery 48 branches after the latter into two other conductors, one, 130, terminating at the contact 131, near the vibrating rod 129, and the other, 132, ending at the plate 133, located in front of the metal brush 134, mounted on the vibrating rod 129.

The electromagnet 125 is provided with an armature 135, secured to the extremity of a rod 136, which is at the other end provided with a rack 137, gearing with the toothed wheel 138, which meshes with the pinion 139, on which pin is pivoted the rod 129, closing the circuits either between the contacts 123 and 131, as will be seen at Fig. 11, or between the plates 133 127 and the metal brushes 134 128, respectively. On the axle of the wheel 138 is wound a spiral spring which during the rotary motion of such wheel and by the onward movement of the armature 135 contracts itself, overcoming its own elastic power; but when the armature 135 is released from the electromagnet 125 the spiral spring causes the toothed wheel 138 to partially rotate, as shown by the arrow 140, thus reëstablishing the circuit between the contacts 123 and 131. The toothed wheels 138 and 139 are further connected with a clockwork or other suitable mechanism, (not shown,) which regulates the movement of the rod 129, so as to delay its return to the resting position for a sufficient length of time to permit of the operation of the other mechanism and such or like mechanism together. Such clockwork, with the wheels 138 and 139, as well as the adjacent mechanism, may be closed in a glass box in order not only to facilitate the inspection, maintenance, and preservation of the delicate parts of the apparatus, but also with a view to insure the secrecy of the correspondence by preventing the excluded stations from reëstablishing the circuit, in which case the box is closed by a seal.

At each station from the conductor-wire 126 branches off the conductor-wire 141, which terminates at contact 117 in the case of station 113, Fig. 10, at contact 118 of station 114, Fig. 11, at contact 119 of station 115, Fig. 12, and finally at contact 120 of station 116, Fig. 13. As will be seen from the drawings, it is only the connection of the conductor 141 which varies from station to station, while the arrangement of the other parts does not differ in any way. In the drawings it is also clearly shown that in the various stations only one of the contacts 117, 118, 119, and 120 is in turn connected to the said circuit-wires 141, while the other contacts have no connection therewith. By lowering the calling-key at one station all contacts 43 are brought into action, and in consequence also all the fly-wheels 21 will start. The contacts 117, 118, 119, and 120, actuated by the lowering of special keys, (not shown,) which may be called "excluding-keys," serve to exclude out of circuit the stations 113, 114, 115, and 116, respectively. Now it is evident that a calling and transmitting station cannot exclude itself from the correspondence. Therefore while the stations are all provided with the contacts 117, 118, 119, and 120 the station 113 will be deprived of the contact-key 117, the station 114 of the contact-key 118, the stations 115 and 116 of the contact-keys 119 and 120, respectively.

The working of the apparatus is as follows: Assumed that the station 115 desires to correspond with station 113 and exclude from the correspondence the stations 114 and 116, the operator at the station 115 lowers the common calling-key, which by means of the magnet 76 will start synchronously the four receivers. Thereby the three stations 113, 114, and 116 are ready to receive the communications, whereupon the operator will proceed to exclude the station 114 by stopping its fly-wheel. By lowering the contact-key 118, Fig. 13, so that when the magnet 36 of the station 114 comes in front of the contact 118 it will release its armature, so as to close the following circuits—viz., 41, 118, 141, 125, 124, 121, 76, 122, 123, 129, 131, 130, 48, and 42—thereby determining the forward movement of the rod 78, and consequently stopping the fly-wheel 21 at said station 114. In the two other stations 113 and 116 and also in the same operating-station 115 the same movement will take place, together with the formation of a contact between the small plates 41 and 118; but as the said plate 118 is not connected in said stations to any circuit no alteration will take place in such stations. The said circuit comprises, however, the magnet 125, which by the attraction of the rod 136 in the direction of the arrow 141 will cause a deviation of the pin 129, thus breaking the circuit of 123 and 131 and establishing at the same time, by means of the brushes 128 and 134 coming in contact with the plates 127 and 133, a new circuit 48, 132, 133, 129, 127, 126, 125, 124, 43, and 42, which will be maintained by the further impulses generated by the station 115 for the exclusion of other stations, as well as for the correspondence. In effect, when from the said station 115 the contact-key 120 is lowered for the purpose of excluding the station 116 in a manner perfectly similar to that described for the exclusion of the station 114 the fly-wheel of the station 114, already excluded, will be in the position of rest. Thereby the action of the local coherer will take place between the plates 41 and 43, which are one in front of the other; but the fly-wheel itself will remain inactive, because the circuit passes through the magnet 125 instead of passing through the magnet 76. Consequently the magnet will continue to remain actuated, and the circuit will not be broken. Having excluded the stations 114 and 116 or any others desired, the station 115 will begin to communicate with 113 and with all the others which have not been excluded. In the excluded stations the fly-wheels 21 are all in the at-rest non-operating position, and each impulse produced by the the actuation of a key has the same effect as before set forth—that is to say, it maintains the attraction of the armature 135, excluding from the circuit the magnet 76, whereby the fly-wheels 21 at all the excluded stations will remain in the at-rest position without any rotation thereof, and there will be no change in the position of the mechanisms as long as the brushes 128 and 134 of the pin 129 abut against the plates 127 and 133. It is, however, necessary that this situation should continue for a certain length of time; otherwise at any suspension in the transmission the circuit through the magnet 76 will again be reëstablished, and the previous operation of exclusion would thereby become ineffective. For this reason the clockwork or other suitable mechanism regulating the movement of the rod 129 is so made that it takes a considerable length of time—for instance, thirty seconds—for the pin to return to the position of rest. Thirty seconds will therefore elapse between two succeeding impulses for maintaining the circuit through the magnet 125 and the isolation of the magnet 76. This period of time having elapsed the rod 129 will again abut against the contacts 123 and 131, and the mechanism will return to the original position, so that the magnets 76 of the stations 114 and 116 will act as soon as such station is called. The correspondence between 115 and 113 being over, the arrest of the relative apparatus will be effected by lowering the common calling-key; but such lowering must take place before the period of thirty seconds has elapsed; otherwise the operation for the arrest of the fly-wheel 21 of the stations 115 and 113 would cause the starting of the fly-wheel in the stations 114 and 116.

By the exclusion of the magnet 76 from the circuit the excluded stations cannot call, because the fly-wheel 21 cannot be brought into action. Such stations should therefore not lower the calling-key when the pin 129 is released from contacts 123 and 131. The immobility of said calling-key in the aforesaid case might also be secured by employing a circuit which would cause a wedge to slide under the calling-key. A self-acting repeating signal mechanism might also be provided adapted to be actuated when long suspensions in the correspondence are foreseen, which suspensions might endanger the stability of the circuit through the magnet 125 when the thirty seconds for the motion of the wheelwork should have elapsed. Such mechanisms have not been shown in the drawings, as they may be constructed in any form at will and are to be considered as details of the before-mentioned mechanism.

What I claim, and desire to secure by Letters Patent, is—

1. In a wireless-telegraph apparatus, a plurality of stations each of which is provided with mechanism for imprinting a plurality of signs one by one, and synchronously-actuated mechanism located at each of the stations for causing the character indicated at the sending-station to be imprinted at the receiving station or stations.

2. In a wireless-telegraph apparatus, a plurality of stations each of which is provided with mechanism for imprinting a plurality of signs one by one, rotative means for governing the signs, located at each station, means for synchronously rotating the rotative mechanism at the various stations governing the imprinting of the signs, and means for governing the synchronous movement of the rotative mechanism at the various stations and for simultaneously starting or stopping of the same.

3. In a wireless-telegraph apparatus, a plurality of stations each of which is provided with mechanism for imprinting a plurality of signs one by one, an actuating-key at each of the stations for actuating each of the signs, rotative mechanism at each of the stations acting either as a portion of the sending or the receiving mechanism and by its position governing the actuation of the individual signs, and means for bringing about the synchronous rotation of the mechanism at the sending-station and the receiving station or stations in such manner that the same signs will be synchronously imprinted at all the stations.

4. In a wireless-telegraph apparatus, a plurality of stations each of which is provided with mechanism for imprinting a plurality of signs one by one, moving means for governing the signs located at each station, means for synchronously moving the moving mechanism at the various stations governing the imprinting of the signs, means for governing the synchronous movement of the moving mechanism at the various stations, and means for simultaneously starting or stopping of the same.

5. In a wireless-telegraph apparatus, a plurality of stations each of which is provided with mechanism for imprinting a plurality of signs one by one, an actuating-key at each of the stations for actuating each of the signs, moving mechanism at each of the stations acting either as a portion of the sending or the receiving mechanism and by its position governing the actuating of the individual signs, and means for bringing about the synchronous movement of the mechanism at the sending-station and the receiving station or stations in such manner that the same signs will be synchronously imprinted at all of the stations.

6. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, a polarized electromagnet carried by the wheel, a plurality of printing devices, an individual electromagnet mechanism for actuating each of such printing devices, and means for bringing about an energizing of each of the electromagnets of the printing mechanism by the energizing of the wheel-magnet.

7. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel at a predetermined rate of speed, a polarized electromagnet carried by the wheel, a plurality of printing devices, an individual electromagnet mechanism for actuating each of such printing devices, and means for bringing about an energizing of each of the electromagnets of the printing mechanism by the energizing of the wheel-magnet.

8. In a wireless-telegraph apparatus, a stationary disk, a broken circuit carried by the disk, a plurality of keys, mechanism connected with each of the keys for contacting with the ends of the circuit without closing the same, mechanism for locking the key mechanism in the connecting position, a rotating wheel located axially adjacent to the disk, mechanism carried by the wheel for completing the circuit and releasing the keys, means for rotating the wheel, an electromagnet carried by the wheel, a plurality of printing devices, an individual electromagnetic mechanism for actuating each of such printing devices, and means for bringing about an energizing of each of the electromagnets of the printing mechanism by the energizing of the wheel-magnet.

9. In a wireless-telegraph apparatus, a stationary disk, a broken circuit carried by the disk, a plurality of keys, mechanism connected with each of the keys for contacting with the ends of the broken circuit, without completing the same, mechanism for locking the key mechanism in the connecting position, a rotating wheel located axially adjacent to the disk, mechanism carried by the wheel for completing the circuit and releasing the keys, means for rotating the wheel at a predetermined rate of speed, an electromagnet carried by the wheel, a plurality of printing devices, an individual electromagnetic mechanism for actuating each of such printing devices, and means for bringing about an energizing of each of the electromagnets of the printing mechanism by the energizing of the wheel-magnet.

10. In a wireless-telegraph apparatus, a local mechanism at each station comprising a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for completing the circuit and for releasing the keys, means for rotating the wheel, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, and electric mechanism at each of the stations for releasing and stopping the rotating wheel.

11. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for completing the circuit and for releasing the keys, means for rotating the wheel at a predetermined rate of speed, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, and electric mechanism at each of the stations for releasing and stopping the rotating wheel.

12. In a wireless-telegraph apparatus, local mechanism at each station comprising a stationary disk, a broken circuit carried by the disk, a plurality of keys, mechanism connected with each of the keys for contacting with each end of the broken circuit without completing the same, mechanism for locking the key mechanism in the contacting position, a rotating wheel located axially adjacent to the disk, mechanism carried by the wheel for completing the circuit and for releasing the keys, means for rotating the wheel, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, and electric mechanism at each of the stations for releasing and stopping the rotating wheel.

13. In a wireless-telegraph apparatus, local mechanism at each station comprising a stationary disk, a broken circuit carried by the disk, a plurality of keys, mechanism connected with each of the keys for contacting with each end of the broken circuit without completing the same, mechanism for locking the key mechanism in the connecting position, a rotating wheel located axially adjacent to the disk, mechanism carried by the wheel for completing the circuit and for releasing the keys, means for rotating the wheel at a predetermined rate of speed, an electromagnet carried by the wheel, a plurality of printing devices, an individual electromagnetic mechanism actuating each of such printing devices, means for bringing about an energizing of each of the electromagnets of the printing mechanism by the energizing of the wheel-magnet, and electric mechanisms at each of the stations for releasing and stopping the rotating wheel.

14. In a wireless-telegraph apparatus, a stationary disk, a conducting-ring carried by the disk, a second conducting-ring concentric with such ring, a plurality of keys, mechanism connected with each of the keys for making a contact with each of the conducting-rings without closing the circuit, mechanism for locking the key mechanism in the connecting position, a rotating wheel located axially adjacent to the disk, mechanism carried by the wheel for completing the circuit and for releasing the keys, means for rotating the wheel, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, and means for selecting the stations desired to be reached and for preventing action of the mechanism at those stations desired to be cut out from the communication.

15. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for completing the circuit and for releasing the keys, means for rotating the wheel at a predetermined rate of speed, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet when opposite thereto, and means for selecting the stations desired to be reached and for preventing action of the mechanism at those stations desired to be cut out from the communication.

16. In a wireless-telegraph apparatus, a stationary disk, a broken circuit carried by the disk, a plurality of keys, mechanism connected with each of the keys for contacting with the ends of the broken circuit without completing the same, mechanism for locking the key mechanism in the connecting position, a rotating wheel located axially adjacent to the disk, mechanism carried by the wheel for completing the circuit and for releasing the keys, means for rotating the wheel, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, and means for selecting the stations desired to be reached and for preventing action of the mechanism at those stations desired to be cut out from the communication.

17. In a wireless-telegraph apparatus, a stationary disk, a broken circuit carried by the disk, a plurality of keys, mechanism connected with each of the keys for contacting with the ends of the broken circuit, without completing the same, mechanism for locking the key mechanism in the connecting position, a rotating wheel located axially adjacent to the disk, mechanism carried by the wheel for completing the circuit and for releasing the keys, means for rotating the wheel at a predetermined rate of speed, an electromagnet carried by the wheel, a plurality of printing devices, an individual electromagnetic mechanism for actuating each of such printing devices and means for bringing about an energizing of each of the electromagnets of the printing mechanism by the energizing of the wheel-magnet, and means for selecting the stations desired to be reached and for preventing action of the mechanism at those stations desired to be cut out from the communication.

18. In a wireless-telegraph apparatus, local mechanism at each station comprising a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for completing the circuit and for releasing the keys, means for rotating the wheel, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, electrically-actuated mechanism at each of the stations for releasing and stopping the rotating wheel, and means for selecting the stations desired to be reached and for preventing action of the mechanism at those stations desired to be cut out from the communication.

19. In a wireless-telegraph apparatus, a stationary disk, a conducting-ring carried by the disk, a second conducting-ring concentric with such ring, a plurality of keys, mechanism connecting with each of the keys for making a contact with each of the conducting-rings without completing the circuit, mechanism for locking the key mechanism in the connecting position, a rotating wheel located axially adjacent to the disk, mechanism carried by the wheel for completing the circuit and for releasing the keys, means for rotating the wheel at a predetermined rate of speed, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, electrically-actuated mechanism at each of the stations for releasing and stopping the rotating wheel, and means for selecting the stations desired to be reached and for preventing action of the mechanism at those stations desired to be cut out from the communication.

20. In a wireless-telegraph apparatus, local mechanism at each station comprising a stationary disk, a broken circuit carried by the disk, a plurality of keys, mechanism connected with each of the keys for connecting with each end of the broken circuit without completing the same, mechanism for locking the key mechanism in the connecting position, a rotating wheel located axially adjacent to the disk, mechanism carried by the wheel for completing the broken circuit and releasing the keys, means for rotating the wheel, an electromagnet carried by the wheel, a plurality of printing devices, an individual electromagnetic mechanism for actuating each of such printing devices and means for bringing about an energizing of each of the electromagnets of the printing mechanism by the energizing of the wheel-magnet, electrically-actuated mechanism at each of the stations for releasing and stopping the rotating wheel, and means for selecting the stations desired to be reached and for preventing action of the mechanism at those stations desired to be cut out from the communication.

21. In a wireless-telegraph apparatus, local mechanism at each station comprising a stationary disk, a broken circuit carried by the disk, a plurality of keys, mechanism connected with each of the keys for connecting with each end of the broken circuit without completing the same, mechanism for locking the key mechanism in the connecting position, a rotating wheel located axially adjacent to the disk, mechanism carried by the wheel for completing the circuit and releasing the keys, means for rotating the wheel at a predetermined rate of speed, an electromagnet carried by the wheel, a plurality of printing devices, an individual electromagnetic mechanism actuating each of such printing devices, means for bringing about an energizing of the electromagnets of the printing mechanism by the energizing of the wheel-magnet, mechanism at each of the stations actuated by the electric current for releasing and stopping the rotating wheel, and means for selecting the stations desired to be reached and for preventing action of the mechanism at those stations desired to be cut out from the communication.

22. In a wireless-telegraph apparatus, an insulating-disk, two concentric conducting-rings provided with adjacent perforations, a circuit including a battery terminating at the ends at such rings, two conducting brush-rings arranged concentric to the first-mentioned rings, a fly-wheel axially coincident with the disk adjacent thereto, a polarized electromagnet carried by the wheel the poles of which are connected by brushes with the brush-rings, an electric keyboard having a plurality of keys each of which is adapted to break the circuit formed in part by the keyboard when moved from its normal position, a conducting-wire leading from one of the first-mentioned rings to the keyboard, a like wire leading from the other extremity of the keyboard to a relay the other pole-wire of which connects with the other first-mentioned ring, a battery included in such circuit, a polarized spring-armature having a contact-head normally in contact with the wheel-magnet, a plurality of character-printing electromagnets' one pole of each of which is connected with an individual electric contact-plate adapted to contact with the head of the spring-armature of the wheel-magnet when released, an annular conducting-ring also adapted to contact with such armature-head whenever released adjacent to the wheel, a battery-circuit wire forming a connection betwen the other poles of the imprinting-magnets and the conducting-ring, an oscillator, a coherer, means for rotating the fly-wheel, and electromagnetic means for starting and stopping the fly-wheel.

23. In a wireless-telegraph apparatus, an insulating-disk, two concentric conducting-rings provided with adjacent perforations, a circuit including a battery terminating at the ends at such rings, two conducting brush-rings arranged concentric to the first-mentioned rings, a fly-wheel axially coincident with the disk adjacent thereto, a polarized electromagnet carried by the wheel the poles of which are connected by brushes with the brush-rings, an electric keyboard having a plurality of keys each of which is adapted to break a circuit formed in part by the keyboard when moved from its normal position, a conducting-wire leading from one of the first-mentioned rings to the keyboard, a like wire leading from the other extremity of the keyboard to a relay the other pole-wire of which connects with the other first-mentioned ring, a battery included in such circuit, a polarized spring-armature having a contact-head normally in contact with the wheel-magnet, a plurality of character-printing magnets one pole of each of which is connected with an individual electric contact-plate adapted to contact with the head of the spring-armature of the wheel-magnet when released opposite thereto, an annular conducting-ring also adapted to contact with such armature-head whenever released adjacent to the wheel, a battery-circuit wire forming a connection between the other poles of the imprinting-magnets and the conducting-ring, an oscillator, a coherer, means for rotating the fly-wheel, and means for selecting the stations to receive the messages and for cutting out stations which it is desired shall not receive the same.

24. In a wireless-telegraph apparatus, a plurality of stations each of which is provided with mechanism for imprinting a plurality of signs one by one, an actuating-key at each of the stations for actuating each of the signs, moving mechanism at each of the stations acting either as a portion of the sending or the receiving mechanism by its position governing the actuation of the individual signs, means for bringing about the synchronous movement of the mechanism at the sending-station and the receiving station or stations in such manner that the same signs will be synchronously imprinted at all the stations, and means for selecting the stations to receive the messages and for cutting out stations which it is desired shall not receive the same.

25. In a wireless-telegraph apparatus, a plurality of stations each of which is provided with mechanism for imprinting a plurality of signs one by one, moving means for governing the signs located at each station, means for synchronously moving the moving mechanism at the various stations governing the imprinting of the signs, means for governing the synchronous movement of the moving mechanism at the various stations and for simultaneously starting or stopping the same, and means for selecting the stations to receive the messages and for cutting out stations which it is desired shall not receive the same.

26. In a wireless-telegraph apparatus, a plurality of stations each provided with a plurality of individual character-printing devices adapted to be actuated from any of the other stations, and selecting means for preventing actuation of the imprinting mechanism at any desired station or stations while permitting of the actuation of such imprinting mechanism at any other desired station or stations.

27. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, means for rotating the wheel, means carried by the wheel for completing the circuit and releasing the keys, a polarized electromagnet carried by the wheel, a polarized spring-armature having an electric contact head or plate in contact with the wheel-magnet, a plurality of character-imprinting electromagnets one pole of each of which is connected with an individual electric contact-plate adapted to contact with the head of the spring-armature of the wheel-magnet when released, an annular conducting-ring also adapted to contact with such armature-head whenever released located adjacent to the wheel, a battery circuit-wire forming a connection between the other poles of the imprinting-magnets and the conducting-ring, an oscillator, a coherer, and electromagnetic means for starting and stopping the fly-wheel.

28. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, a polarized electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, a stop carried by the wheel, a toothed wheel through the spaces of which the stop-head is free to pass mounted adjacent to the wheel, and mechanism for intermittently rotating the wheel.

29. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, a polarized electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, a stop carried by the wheel, a toothed wheel through the spaces of which the stop-head is free to pass mounted adjacent to the wheel, and electric magnetic mechanism for causing intermittent rotation of the wheel.

30. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, a polarized electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, a stop carried by the wheel, a toothed wheel through the spaces of which the stop-head is free to pass mounted adjacent to the wheel, mechanism for intermittently rotating the toothed wheel, and mechanism actuated by wireless electric currents governing the action of the intermittently-rotative means.

31. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, a polarized electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, a stop carried by the wheel, a toothed wheel through the spaces of which the stop-head is free to pass mounted adjacent to the wheel, an electric magnetic mechanism for intermittently rotating the wheel, and mechanism actuated by wireless electric currents governing the action of the electromagnetic rotating means.

32. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, a polarized electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, a stop carried by the wheel, a toothed wheel through the spaces of which the stop-head is free to pass mounted adjacent to the wheel, mechanism for intermittently rotating the wheel, and a coherer controlling the movement of the electromagnetic rotating means.

33. In a wireless-telegraph apparatus, a stationary disk, a conducting-ring carried by the disk, a second conducting-ring concentric with such ring, a plurality of keys, mechanism connected with each of the keys for making a contact with each of the conducting-rings without completing the circuit, mechanism for locking the key mechanism in the connecting position, a rotating wheel located axially adjacent to the disk, mechanism carried by the wheel for closing the circuit through the key mechanism and for releasing the keys, means for rotating the wheel, an electromagnet carried by the wheel, a plurality of printing devices, an individual electromagnetic mechanism for actuating each of such printing devices, means for bringing about an energizing of each of the electromagnets of the printing mechanism by the energizing of the wheel-magnet, a stop carried by the wheel, a toothed wheel through the spaces of which the stop-head is free to pass mounted adjacent to the wheel, an electric magnetic mechanism for intermittently rotating the wheel, and a coherer controlling the movement of the electromagnetic rotating means.

34. In a device of the class described, comprising a plurality of stations, a station selecting and excluding device at each station comprising an electric conducting-ring, a wheel rotating within the ring, a main calling contact-piece adjacent to the conducting-ring at each station, like contacts similar in number to the stations also arranged adjacent to the ring at each station in the same relative position at each, an armature actuated by the wheel-magnet for bringing about contact between any one of the contact-pieces and the conducting-ring, means for rotating the wheel, means for releasing and stopping the wheel included in the calling-key contact-plate circuit, a circuit connected with the calling-key contact-plate comprising an electromagnet for closing the broken circuit to stop the wheel, and a connecting-wire leading from the magnet-circuit to a contact differing in position from the plate connected in like manner at any of the other stations.

35. In a device of the class described, comprising more than two stations selecting and excluding mechanism comprising a rotating wheel 21, a magnet 36, having an armature carrying an electric contact-plate 41, a conducting-ring 42, contact-plates 43, 117, 118, 119 and 120, arranged adjacent to the ring 42 in like position at each of the stations, a wire 121 connecting the plate 43 at each station with a wheel releasing and stopping magnet 76, a wire 122 leading from the other pole of the magnet to a contact 123, adapted to be connected with a wire 130 in connection with the ring 42 by a vibrating conducting-arm 128 by way of a contact-plate 131, a battery 48 in the last-mentioned circuit, a contact-piece 127, adjacent to a like contact-plate 133, means carried by the vibrating arm 129 for closing the circuit between the plate 127 and 133 when forced away from the plates 123 and 131, a wire 132 with the wire 130, an electromagnet 125 connected by a wire 124 with the contact-plate 43, and by a wire 126 with the contact-plate 127, mechanism actuated by the magnet 125 for vibrating the contact-lever 129, and a wire 141 connecting the wire 126 with one of the station contact-plates, the construction being the same at each station save that the wire 141 is connected to a different contact-plate at each.

36. In a wireless electric apparatus, designed to act at a distance on the respective type bars or levers of a type-writer, consisting of a fly-wheel at each station, provided with means for establishing a circuit rotating against a disk fitted with four conductor-rings two of which are in communication with the poles of an oscillator which excites simultaneously the local coherer and the coherer of the corresponding station, and the other two communicating with a polarized electromagnet the armature of which when the current flows in the coil releases said coil and closes an electric circuit varying according to the position of the fly-wheel and to the lowered key of the transmitting-station, in which circuit is inserted another electromagnet the armature of which is carried by the lever of a type-writer key corresponding to the one lowered at the transmitting-station, the movements of both fly-wheels in the two stations being synchronous.

37. In a wireless electric apparatus type-writer, an oscillator, a plurality of transmitting-keys each provided at the end of their actuating-levers with a fork having insulated conducting-prongs formed by two uprights ending with hooks and regulated by springs which uprights through the lowering of the keys penetrate into a pair of holes arranged in two conducting-rings, of the fixed disk in combination so as to electrically connect the same with a wedge-shaped contact-piece carried by the fly-wheel, such contact-piece on the rotation of the fly-wheel penetrating between the said hooks, thereby closing the circuit of the oscillator and slightly separating the hooks so as to release them from the disk and break the circuit.

38. In a wireless electric printing-telegraph, the combination with two metallic brushes fitted to the fly-wheel and connected to the poles of a polarized electromagnet which acts on the type-key bars or levers of two metal rings secured to a fixed disk, said rings being connected to the poles of an electromagnetic relay, the action of which takes place upon the excitation of the coherer.

39. In a wireless electric printing-telegraph, an oscillator, a coherer excited by the oscillator, in connection with a relay from which two circuits branch out, the one including two metal rings on which two brushes slide, which circuits are one in actuating connection with the type-key levers and the other with an electromagnet attracting the coherer, which owing to the shock will be depolarized and becomes again inactive, so bringing the relay and the relative circuits out of action, until the oscillator emits fresh exciting electric waves.

40. In a wireless electric printing-telegraph, a keyboard formed of small metal plates, kept apart from each other but connected electrically by the base of the keys, when in the normal position in such manner that the lowering of a key in the transmitting-station will break the circuit, while the similar circuit at the receiving-station remains unaltered, when no keys are lowered, except the special calling-key, the movement of which does not break the continuity of the circuit, said keyboard being supplied with an auxiliary metal plate, which when lowered so as to be brought in contact with the keyboard renders the latter electrically continuous irrespective of the position of the keys.

41. In a wireless electric printing-telegraph, a calling-key, a fly-wheel, an electromagnet mechanism which rotates a toothed wheel controlled by the calling-key so that at the first lowering of the key a tooth is caused to escape and by means of a motor mechanism the rotation of the fly-wheel is effected, while on the next subsequent lowering of such calling-key the fly-wheel is always stopped in the position of rest, both movements occurring at the same time in the two stations, they being produced by the action of the electric waves of the two coherers, the motor movements being synchronous.

42. In a wireless electric printing-telegraph, a fly-wheel, a toothed wheel for starting and stopping the fly-wheel in connection with a bolt controlled by a spring, which bolt penetrates into suitable recesses cut out in the central disk of the toothed wheel for fixing the position of said wheel, mechanism for disengaging the bolt being controlled by the same rod which starts said disk and in connection with a small pin mounted on the fly-wheel supplied with a tube, in which slides a rod intended to meet the teeth of the wheel, such rod being regulated by a spring.

43. In a wireless electric printing-telegraph, the combination with a coherer, of an oscillator, a receiving and transmitting rod connected with electric circuits and a switch so as to establish the simultaneous communication between both stations, such operation being effected by lowering a continuous electric conducting-plate on to the keyboard.

44. In a wireless electric printing-telegraph, the combination with a calling-key of an apparatus mechanically releasing the local fly-wheel, while the like wheel at the receiving-station is driven under the action of the coherer, and a metal casing preserving the local coherer from action by the local oscillator.

45. In a wireless electric printing-telegraph, special contact-pieces for excluding any stations with which it is not desired to correspond, such pieces being similarly arranged around the fly-wheels of each apparatus, each of them forming respectively part of a circuit wherein an auxiliary magnet is inserted, the armature of which acts on a switch intended to prevent the motion of the fly-wheel of the excluded stations, this switch being connected to toothed wheels and motor mechanism for the purpose of regulating the movement of the switch and delaying for a fixed time the return of such switch to the at-rest position.

46. In a device of the class described, a closed circuit including a battery, a plurality of keys adapted to break the circuit when moved, and means for permanently closing the circuit so that movement of the keys will not break the same.

In testimony whereof I have signed this specification in the presence of two subscribing witnesses.

GIUSEPPE MUSSO.

Witnesses:
  MARIO GIUSEPPE,
  A. FERRARI.